United States Patent [19]
Serban et al.

[11] 3,929,837
[45] Dec. 30, 1975

[54] 2,3-DIHYDRO-2,2-DIMETHYL-7-ISOPROPYL BENZOFURAN AND 2-(2,3-DIHYDRO-2,2-DIMETHYL-7-BENZOFURANYL)ISOPROPYL HYDROPEROXIDE

[75] Inventors: Alexander Serban, Doncaster; Phillip Knox Engel, Tullamarine, both of Australia

[73] Assignee: ICI Australia Limited, Melbourne, Australia

[22] Filed: Jan. 16, 1975

[21] Appl. No.: 541,662

Related U.S. Application Data

[62] Division of Ser. No. 411,404, Oct. 31, 1973, Pat. No. 3,876,667, which is a division of Ser. No. 297,724, Oct. 16, 1972, Pat. No. 3,816,473.

[30] Foreign Application Priority Data

Nov. 8, 1971   Australia............................ 6929/71

[52] U.S. Cl.......................................... 260/346.2 R
[51] Int. Cl.².......................................... C07D 307/79
[58] Field of Search ............................ 260/346.2 R

[56] References Cited
UNITED STATES PATENTS
3,723,472   3/1973   Start et al. ................... 260/346.2 R

OTHER PUBLICATIONS

Rudolfi et al., Chem. Abstracts, Vol. 63, (1965), 6944f.

*Primary Examiner*—Henry R. Jiles
*Assistant Examiner*—Bernard I. Dentz
*Attorney, Agent, or Firm*—Cushman, Darby & Cushman

[57] ABSTRACT

A process for the preparation of carbofuran which process comprises converting σ-isopropylphenol to 2,3-dihydro-2,2-dimethyl-7-isopropylbenzofuran (I); reacting (I) with an oxygen containing gas to form 2-(2,3-dihydro-2,2-dimethyl-7-benzofuranyl)-isopropyl hydroperoxide (II); catalytically decomposing (II) to form 2,3-dihydro-2,2-dimethyl-7-hydroxybenzofuran (III); reacting (III) with methyl isocyanate to form 2,3-dihydro-2,2-dimethyl-7-benzofuranyl N-methylcarbamate (carbofuran) and recovering said carbamate. New compounds useful as intermediates in the above process are also described.

3 Claims, No Drawings

2,3-DIHYDRO-2,2-DIMETHYL-7-ISOPROPYL BENZOFURAN AND 2-(2,3-DIHYDRO-2,2-DIMETHYL-7-BENZOFURANYL)ISOPROPYL HYDROPEROXIDE

This is a division of application Ser. No. 411,404, filed Oct. 31, 1973, now U.S. Pat. No. 3,876,667, which in turn is a divisional of Ser. NO. 297,724, filed Oct. 16, 1972, now U.S. Pat. No. 3,816,473.

This invention relates to processes for the manufacture of carbofuran.

Carbofuran, 2,3-dihydro-2,2-dimethyl-7-benzofuranyl N-methylcarbamate, is known to be useful as an insecticide, but hitherto it has suffered from the commercial disadvantage of being relatively expensive and difficult to make when compared with other commercially available insecticides. It is known that carbofuran may be made using catechol as a starting material; catechol however is comparatively expensive and is most inconvenient to use because it contains two reactive hydroxy groups and there is therefore a pronounced tendency for large quantities of undesired by-products to be formed and the overall yield and the purity of the desired product are relatively low. Processes are also known whereby carbofuran may be made using σ-chlorophenol or σ-nitrophenol as starting materials, but these processes suffer from the disadvantage that many reaction steps are required and hence that relatively low overall yields of carbofuran are obtained.

We have now found that carbofuran can be readily prepared in yields higher than has hitherto been possible by a new process using σ-isopropylphenol as a starting material.

Accordingly we provide a process for the manufacture of 2,3-dihydro-2,2-dimethyl-7-benzofuranyl N-methylcarbamate which process comprises:

1. reacting σ-isopropylphenol with isobutyraldehyde to form 2,3-dihydro-2,2-dimethyl-7-isopropylbenzofuran of the structural formula: range from 1 to 5 hours. The desired benzofuran product may be recovered by conventional means, for example by solvent extraction means and purified for example by distillation.

Although the reaction step (2) described above may be performed at ambient temperature, the reaction rate is rather slow for practical purposes and it is more convenient to use temperatures above the ambient range for example temperatures in the range from 60° to 150°C. are useful; preferably the temperature is in the range from 80° to 130°C. The source of oxygen may be oxygen gas itself, but mixtures of oxygen with other gases may be used. Thus for example air is a convenient source of oxygen. The reaction is preferably carried out in the presence of a catalyst which may be chosen from amongst those materials known to promote peroxidation. Thus for example the reaction may be catalysed by photochemical means for example by means of irradiation with ultraviolet light. From amongst chemical compounds suitable for use as peroxidation catalysts there may be mentioned azobis-isobutyronitrile; salts of alkali metals and akaline earth metals with organic acids, for example calcium formate, potassium formate, barium stearate, magnesium oxalate, sodium oxalate, sodium benzoate; metal carbonates and hydroxides such as barium carbonate, calcium carbonate, sodium carbonate, sodium hydrogen carbonate, sodium hydroxide, calcium hydroxide and mixtures thereof such as a mixture of calcium carbonate and sodium carbonate; oxides, hydroxides and salts of metals of variable valency such as cobalt, manganese, mercury, iron and copper; naphthenates, acetates and linoleates of copper, lithium, manganese, nickel and lead; and resinates of metals of variable valency such as manganese resinate. Other useful catalysts include aliphatic alcohols such as methanol, ethanol, octanol and decanol; and esters of β-ketoacids for example ethylacetoacetate and ethylbenzoylacetate. Peroxidation may also be promoted by passing gaseous ammonia through the reaction mixture. We have also found that the reaction may be initiated by including in the initial reaction mass a small amount of the desired 2-(2,3-dihydro-2,2-dimethyl-7-benzofuranyl)-isopropylhydroperoxide obtained in a previous synthesis. When such a material is used it is advantageous that there be present also a metal salt for example a salt of copper or silver. It is sometimes convenient to carry out the reaction in a liquid medium, for example in an aqueous medium. An aqueous medium in the form of an emulsion is particularly convenient. The nature of the emulsifying agent is not narrowly critical and cationic, anionic or non-ionic emulsifying agents may be used. Suitable agents of the cationic type include for example quaternary ammonium compounds such as cetyltrimethylammonium bromide. Suitable agents of the anionic type include for example soaps, salts of aliphatic monoesters of sulphuric acid, for example sodium lauryl sulphate, salts of sulphonated aromatic compounds, for example sodium dodecyl-benzene sulphonate, sodium, calcium, or ammonium lignosulphonate, butylnaphthalene sulphonate and a mixture of the sodium salts of di-isopropyl and tri-isopropylnaphthalene sulphonic acids. Suitable agents of the non-ionic type include for example the condensation products of an alkylene oxide such as ethylene oxide or propylene oxide with fatty alcohols such as oleyl alcohol or cetyl alcohol, or with alkylphenols such as octyl-phenyl, nonyl-phenol and octyl-cresol. Other non-ionic agents are the partial esters derived from long chain fatty acids and hexitol anhydrides, the condensation products of the said partial esters with an alkylene oxide such as ethylene oxide or propylene oxide and the lecithins. Under these circumstances the reaction is preferably performed under alkaline conditions, for example wherein the aqueous medium has a pH of 9 or more.

The time required to complete the reaction will vary with the reaction conditions chosen for example the rate at which the oxygen or oxygen containing gas is fed into the reaction vessel, the degree and extent of stirring or the temperature at which the reaction is performed as well as the nature of the catalyst and the oxygenating agent. We have found for example that when oxygen is fed into the stirred reaction medium maintained at about 100°C. acceptable yields of product can be obtained after the reaction has progressed for a period of from 4 to 24 hours depending on the rate of oxygen flow.

The reaction step (3) described above is conveniently performed without the intermediate separation of the 2-(2,3-dihydro-2,2-dimethyl-7-benzofuranyl)-isopropyl hydroperoxide from the reaction mixture of step (2). However should isolation be desirable the compound may be separated from the reaction mixture by conventional means for example by solvent extraction, by distillation or by precipitation as a salt of a metal. The reaction temperature of step (3) is not narrowly critical and the reaction may be performed at elevated temperatures if desired, but we have found that satisfactory conversion of the 2-(2,3-dihydro-2,2-dimethyl-7-benzofuranyl)-isopropylhydroperoxide to 2,3-dihydro-2,2-dimethyl-7-hydroxybenzofuran may be effected satisfactorily and in high yield when the reaction is performed at ambient temperatures. The nature of the decomposition catalyst used in the above conversion is not narrowly critical. Thus the catalyst may be an inorganic or an organic acid or alternatively mixtures of inorganic and organic acids may be used. From amongst suitable acids there may be mentioned sulphuric acid, hydrochloric acid, phosphoric acid, acetic acid, perchloric acid, formic acid, p-toluene sulphonic acid. Other suitable catalysts include sulphates of metals of Groups I and II of the Periodic Table of elements for example copper sulphate and calcium sulphate; halides of Groups III and VIII of the Periodic Table of elements such as boron trifluoride and ferric chloride. Decomposition may also be effected by passing acidic gases such as sulphur dioxide and sulphur trioxide through the reaction mixture. The reaction time is not unduly prolonged and a satisfactory degree of decomposition is usually obtained in a time ranging from a few, say ten, minutes to about an hour. The desired product may be recovered from the reaction mixture by extraction means and purified in conventional manner for example by distillation.

The reaction step ( 4 ) is well known and involves reacting the product of reaction ( 3 ) with methyl isocyanate in an inert solvent, for example diethylether, or dioxan, in the presence of a catalyst, for example an amine such as

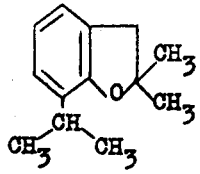

(I)

2. reacting said 2,3-dihydro-2,2-dimethyl-7-isopropylbenzofuran with oxygen or an oxygen containing gas at an elevated temperature preferably in the presence of a catalyst and under non-acidic, preferably alkaline, conditions to form 2-(2,3-dihydro-2,2-dimethyl-7-benzofuranyl)-isopropylhydroperoxide of the structural formula.

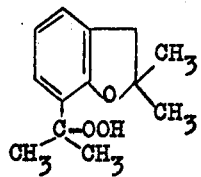

(II)

3. decomposing said 2-(2,3-dihydro-2,2-dimethyl-7-benzofuranyl)-isopropyl hydroperoxide, optionally without a separate isolation step, by catalytic means to form 2,3-dihydro-2,2-dimethyl-7-hydroxybenzofuran of the structural formula:

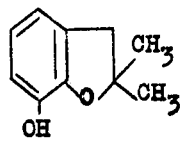

(III)

4. reacting said 2,3-dihydro-2,2-dimethyl-7-hydroxybenzofuran with methylisocyanate to form 2,3-dihydro-2,2-dimethyl-7-benzofuranyl N-methylcarbamate of the structural formula:

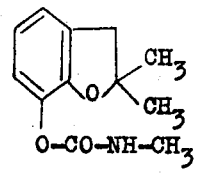

and recovering said carbamate.

In the process described above the reaction step ( 1 ) between σ-isopropylphenol and isobutyraldehyde is preferably performed in the presence of an inert water immiscible solvent for example an aromatic hydrocarbon such as benzene, toluene or xylene or a halogenated hydrocarbon such as ethylene dichloride at an elevated temperature. Although not critical a preferred reaction temperature range is from 40° to 150°C.; a very suitable reaction temperature is the reflux temperature of the reaction mixture. The reactants may be used in equimolecular proportions but it is preferred that an excess of isobutyraldehyde be used. The reaction should be performed in the presence of a catalyst. Suitable catalysts are of the acidic type for example sulphuric acid, hydrochloric acid, chlorosulphonic acid, p-toluene sulphonic acid and trifluoromethane sulphonic acid. The reaction time required for a satisfactory yield of product will depend amongst other things on the reaction temperature, the degree and rate of removal from the reaction mixture of water formed during the reaction and the mole ratio of the reactants. We have found however that suitable reaction times when the reaction is performed at the reflux temperature of a solvent boiling in the range from 40° to 150°C. and with continuous removal of the water formed during the reaction are in the triethylamine or dibutyltin diacetate. The desired product may then be separated from the reaction mixture and purified by known means for example by crystallization.

In a further embodiment of our invention we provide a process for the manufacture of 2,3-dihydro-2,2-dimethyl-7-benzofuranyl N-methylcarbamate which process comprises reacting σ-isopropylphenol with a methallyl halide, preferably methallyl chloride, preferably in the presence of a base to form σ-isopropylphenyl methallyl ether of the structural formula:

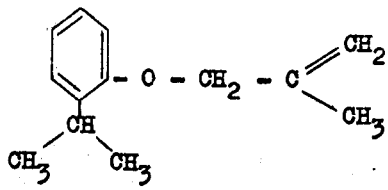

(IV)

rearranging and ringclosing the said σ-isopropylphenyl methallyl ether, preferably by heating it at an elevated temperature, to form the compound 2,3-dihydro-2,2-dimethyl-7-isopropylbenzofuran; and converting said 2,3-dihydro-2,2-dimethyl-7-isopropylbenzofuran to 2,3-dihydro-2,2-dimethyl-7-benzofuranyl N-methylcarbamate by the steps of the process as hereinbefore described.

The reaction of the σ-isopropylphenol with the methallyl halide is preferably performed at an elevated temperature, conveniently at the reflux temperature of the reaction mixture. Stoichometric proportions of the phenol and halide may be used, but it is preferred that there be present in the reaction mixture an excess of methallyl halide. The reaction time will vary with the concentrations of reactant and temperatures used, but typical reaction times are from 2 to 10 hours. The reaction is conveniently performed in the presence of a solvent, for example acetone or an alcohol such as methanol. A suitable base is an alkali or alkaline earth metal hydroxide, oxide or carbonate, for example sodium hydroxide, potassium hydroxide, calcium oxide or potassium carbonate. The σ-isopropylphenyl methallyl ether may be extracted from the reaction mixture by solvent means and purified by conventional means for example by distillation.

The conversion of σ-isopropylphenyl methallyl ether to 2,3-dihydro-2,2-dimethyl-7-isopropylbenzofuran requires elevated temperatures for rapid reaction rates, for example in the range from 200° to 270°C. The reaction is preferably performed in the presence of a catalyst, for example magnesium chloride. The time taken for the ring closure will depend on the temperature at which the reaction is effected. Thus for example at 240°C. suitable yields of product are obtained in about 2 hours.

In yet a further embodiment of our invention σ-isopropylphenol may be converted to carbofuran using the intermediate compounds IV, I, II and III described above with the variation that the conversion of compound IV to compound I is performed in a manner different to that described above.

Accordingly we provide a process for the manufacture of 2,3-dihydro-2,2-dimethyl-7-benzofuranyl N-methylcarbamate which process comprises reacting σ-isopropylphenol with a methallyl halide, preferably methallylchloride, in the presence of a base to form σ-isopropylphenyl methallyl ether, rearranging said σ-isopropylphenyl methallyl ether in the presence of a catalyst to form 2-isopropyl-6-methallylphenol of the structural formula:

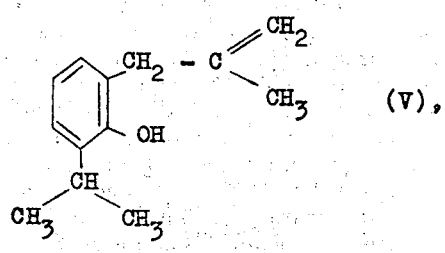

ring closing the said 2-isopropyl-6-methallylphenol preferably by heating it at an elevated temperature optionally in the presence of a catalyst to form 2,3-dihydro-2,2-dimethyl-7-isopropylbenzofuran, and converting said 2,3-dihydro-2,2-dimethyl-7-isopropylbenzofuran to 2,3-dihydro-2,2-dimethyl-7-benzofuranyl N-methylcarbamate by the steps of the process as hereinbefore described.

The process of rearranging σ-isopropylphenyl methallyl ether is preferably performed at elevated temperatures conveniently at the reflux temperature of the reaction mixture. The time of reaction will vary dependent on the reaction conditions used; we have found for example that at slightly below or at reflux temperatures satisfactory yields can be obtained in a relatively short time for example in periods not exceeding two hours. From amongst suitable catalysts there may be mentioned those of the basic type for example quinoline and tertiary amines such as N,N-diethylaniline.

The process of ring closing 2isopropyl-6-methyllylphenol to form 2,3-dihydro-2,2-dimethyl-7-isopropylbenzofuran may be performed over a wide range of temperatures for example in the range from 150° to 270°C., but it is preferred that the reaction be carried out at a temperature in the range from 200° to 250°C. Suitable catalysts include for example pyridine hydrochloride, 90% formic acid, phosphoric acid, and a mixture of hydrobromic acid and glacial acetic acid. The reaction time will vary depending on the conditions used; thus for example when the reaction is performed at a temperature of about 200° to 240°C. in the presence of pyridine hydrochloride suitable yields of product are obtained in periods of time not exceeding 3 hours.

Our process may be carried out on a batchwise, a semi-continuous or continuous basis. It will be appreciated that the yield of desired product will depend to some extent on the scale of the process used, and the degree to which unreacted materials obtained at various stages of the process are recovered and reused.

As far as we are aware certain of the intermediate products of our process have neither been described previously nor have they been manufactured. Accordingly we provide as new compounds the following substances:- 2,3-dihydro-2,2-dimethyl-7-isopropylbenzofuran; 2-(2,3-dihydro-2,2-dimethyl-7-benzofuranyl)isopropylhydroperoxide; σ-isopropylphenyl methallyl ether; and 2-isopropyl-6-methallylphenol. As is apparent from the foregoing description these compounds are useful intermediates in the preparation of chemicals, particularly in the preparation of chemicals exhibiting biological activity and more particularly in the preparation of carbofuran.

We also provide as new processes the processes as herein described whereby the new compounds as set out above may be prepared.

Our process as hereinbefore described is advantageous in that it provides a means whereby 2,3-dihydro-2,2-dimethyl-7-benzofuranyl N-methylcarbamate may be prepared more conveniently and in higher yield and purity than has hitherto been possible. This has the attendant advantage that because of the lower cost of the desired product, its use will become more economic in the eradication and control of undesired insects.

Our invention is now illustrated, by but by no means limited to, the following examples wherein all parts and percentages are on a weight basis unless otherwise specified.

EXAMPLE 1

Into a flask fitted with a reflux condenser and a Dean and Stark water collection trap there were charged 68 g. σ-isopropylphenol, 30 ml. benzene and 1 ml. concentrated sulphuric acid. The mixture was heated to reflux temperature, 36 g. isobutraldehyde was added dropwise to the refluxing mixture over a period of 1.5 hours, after which time the refluxing was continued for a further 1.5 hours. The water formed during the reaction was removed continuously from the reaction mixture by means of the Dean and Stark apparatus. The reaction mixture was distilled under reduced pressure. The distillate was dissolved in petroleum ether and the resultant solution was extracted with a 30% potassium hydroxide solution in methanol to remove unreacted σ-isopropylphenol. The purified petroleum ether solution was washed with water, dried over sodium sulphate and then fractionally distilled under reduced pressure to give 37.1 g. of a colourless oil which had a boiling range of 98° to 100°C. at 8 mm Hg. The oil was identified by elemental analysis, nuclear magnetic resonance and infrared spectroscopy as 2,3-dihydro-2,2-dimethyl-7-isopropylbenzofuran. There was thus obtained a new compound useful as an intermediate material in the manufacture of carbofuran. 15.7 g. of unreacted o-isopropylphenol was recovered from the methanolic potassium hydroxide solution.

EXAMPLE 2

Into a flask fitted with a gas inlet and a condenser there were charged 95 g. 2,3-dihydro-2,2-dimethyl-7-isopropylbenzofuran prepared by the method of Example 1 and 10 mg. azobisisobutyronitrile. The mixture was stirred and heated so as to maintain the temperature of the mixture in the range from 90° to 100°C. Oxygen was passed through the mixture for 9 hours. After this time the reaction mixture was fractionally distilled under reduced pressure to give 11.5 g. of a liquid identified by elemental analysis and infrared spectroscopy as 2-(2,3-dihydro-2,2-dimethyl-7-benzofuranyl)isopropylhydroperoxide. There was thus obtained a new compound useful as an intermediate in the manufacture of carbofuran.

EXAMPLE 3

Using the general procedure as described in Example 2 95 g 2,3-dihydro-2,2-dimethyl-7-isopropylbenzofuran mixed with 10 mg. azobisisobutyronitrile was treated with oxygen for 9 hours. The resultant mixture was then cooled to room temperature and without separating the 2-(2,3-dihydro-2,2-dimethyl-7-benzofuranyl)-isopropylhydroperoxide from the mixture there was added with stirring a mixture of 150 ml glacial acetic acid and 1.5 ml 70% perchloric acid. After 15 minutes a red solution had formed. This solution was diluted with water, extracted with diethyl ether and the resultant aqueous and ethereal phases separated one from the other. The ethereal phase was washed with water, extracted with 2N aqueous sodium hydroxide solution, separated from the alkaline aqueous phase, washed with water and dried. The solvent was removed and unreacted 2,3-dihydro-2,2-dimethyl-7-isopropylbenzofuran recovered by distillation. The alkaline aqueous phase referred to above was acidified with hydrochloric acid and extracted with diethylether. The resultant ethereal phase was washed with water, dried over sodium sulphate and the solvent was removed by distillation. From the residue there was obtained by distillation at reduced pressure 7.2 g of an oil having a boiling range of 86° to 87°C. at 1.3 mm Hg and identified by elemental analysis, nuclear magnetic resonance and infrared spectroscopy as 2,3-dihydro-2,2-dimethyl-7-hydroxy benzofuran. There was thus obtained an intermediate product useful in the manufacture of carbofuran.

EXAMPLE 4

To a cold solution of 8.2 g. 2,3-dihydro-2,2-dimethyl-7-hydroxybenzofuran prepared by the method of Example 3 in 10 ml. of diethyl ether, there was added 0.05 g triethylamine and 2.9 g methylisocyanate. The mixture was stirred at room temperature for 15 minutes and a white crystalline product precipitated. Separation of the solid yielded 8.8 g of a product having a melting point of 151°-2°C. and identified by elemental analysis, nuclear magnetic resonance and infrared spectroscopy as 2,3-dihydro-2,2-dimethyl-7-benzofuranyl N-methylcarbamate.

EXAMPLE 5

To a stirred solution of 40 g sodium hydroxide in 200 ml methanol there was added 68 g σ-isopropylphenol. The mixture was brought to reflux temperature under an atmosphere of nitrogen, and over a period of 30 minutes there was added 60 g methallyl chloride. The reaction mixture was refluxed for a further 3.5 hours and then cooled. Sodium chloride which had formed during the reaction was removed from the reaction mixture by filtration and the solvent removed by distillation under vacuum. The residual brown oil was dissolved in petroleum ether having a boiling range from 40° – 60°C., treated with a 20% aqueous sodium hydroxide solution and the aqueous and ethereal phases separated. The aqueous phase was acidified to pH and 15.6 g of σ-isopropylphenol recovered therefrom. The ethereal phase was washed with water, dried over sodium sulphate and the solvent removed by vacuum distillation. The residue was fractionally distilled under reduced pressure to yield 72.2 g of a product having a boiling range of 106°–112°C at 9.5 mm Hg. This product was identified by elemental analysis, nuclear magnetic resonance and infrared spectroscopy as σ-isopropylphenol methallyl ether. There was thus obtained a new compound useful as an intermediate in the manufacture of carbofuran.

EXAMPLE 6

10.0 g σ-isopropylphenyl methallyl ether prepared by the method of Example 5 and 0.15 g anhydrous magnesium chloride were heated under an atmosphere of nitrogen at 240°C. for 2 hours. The resultant reaction mixture was cooled, dissolved in 100 ml. petroleum ether of boiling range 40° – 60°C., washed with water and extracted with a 30% solution of potassium hydroxide in methanol. The petroleum ether phase was washed with water and dried over sodium sulphate. The solvent was removed and the residue distilled under reduced pressure to give 4 g of an oil having a boiling range of 98° to 100°C. at 8 mm Hg and identified by elemental analysis and infrared spectroscopy as 2,3-dihydro-2,2-dimethyl-7isopropylbenzofuran.

EXAMPLE 7

A mixture of 5.7 g σ-isopropylphenyl methallyl ether prepared by the method of Example 5 and 3.0 g N,N-diethylaniline was maintained at reflux temperature for 30 minutes in a 100 ml flask fitted with a reflux condenser. After this time the content of the flask was cooled to room temperature, dissolved in 100 ml petroleum ether and extracted with dilute hydrochloric acid. The residue was extracted twice with a 30% potassium hydroxide solution in methanol. The methanolic extract was diluted with water (400 ml), acidified with concentrated hydrochloric acid to pH2 and extracted with petroleum ether (100 ml) of boiling range 40° to 60°C. The petroleum ether phase was separated, washed with water, dried over sodium sulphate and submitted to vacuum distillation whereby there was obtained 2.7 g of an oil identified by elemental analysis and infrared spectroscopy as 2-isopropyl-6-methallylphenol. There was thus obtained a new compound useful as an intermediate in the manufacture of carbofuran.

EXAMPLE 8

19 g 2-isopropyl-6-methallylphenol prepared by the method of Example 7 and 23 g pyridine hydrochloride were heated at 240°C. in an atmosphere of nitrogen for 2 hours in a 250 ml flask. After this time the content of the flask was cooled to room temperature, dissolved in petroleum ether of boiling range 40° – 60°C., extracted with dilute hydrochloric acid and then with a 30% solution of potassium hydroxide in methanol. Pyridine hydrochloride was recovered from the aqueous acid phase and unconverted 2-isopropyl-6-methallylphenol was recovered from the alkaline methanolic phase after separation from the petroleum ether phase. The petroleum ether phase was washed with water, dried over sodium sulphate and the solvent was removed. The residue was fractionally distilled under reduced pressure to yield 12 g of a colourless oil which had a boiling range of 98° to 100°C. at 8 mm Hg and which was identified by elemental analysis and infrared spectroscopy as 2,3-dihydro-2,2-dimethyl-7-isopropylbenzofuran. The product was suitable as an intermediate for the preparation of carbofuran.

EXAMPLE 9

Into a flask fitted with a gas inlet and a condenser there were charged 10.3 g 2,3-dihydro-2,2-dimethyl-7-isopropylbenzofuran and 45 ml of an aqueous solution containing 1.3% w/v sodium carbonate and 0.3% w/v sodium stearate. The mixture was stirred vigorously so as to form an emulsion. Oxygen was bubbled through the stirred reaction mixture for 24 hours, the reaction mixture being maintained at 100°C. during this time. The contents of the flask were cooled to 20°C. and the emulsion was broken by passing carbon dioxide through the mixture until an aqueous layer and organic layer were formed. Ether was added to the flask and the organic layer was separated, then washed with water, dried over sodium sulphate and heated to remove the solvent. To the residual yellow liquid there was added 15 ml glacial acetic acid containing 6 drops of perchloric acid and the mixture was stirred for 15 minutes at 20°C. The resultant red liquid was diluted with water and by the procedure set out in Example 3 there was obtained from this solution 2,3-dihydro-2,2-dimethyl-7-hydroxybenzofuran.

We claim:
1. A benzofuran selected from the group consisting of 2,3-dihydro-2,2-dimethyl-7-isopropylbenzofuran and 2-(2,3-dihydro-2,2-dimethyl-7-benzofuranyl)isopropylhydroperoxide.
2. 2,3-dihydro-2,2-dimethyl-7-isopropylbenzofuran.
3. 2-(2,3-dihydro-2,2-dimethyl-7-benzofuranyl)isopropylhydroxide.

* * * * *